No. 897,257. PATENTED AUG. 25, 1908.
M. R. HANNA.
DYNAMO ELECTRIC MACHINE.
APPLICATION FILED FEB. 19, 1908.
4 SHEETS—SHEET 1.
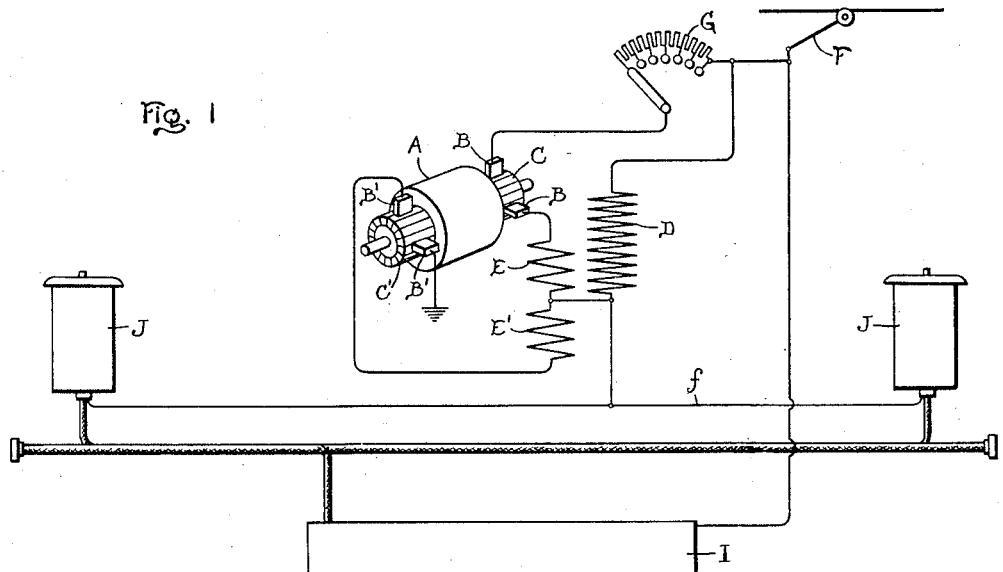
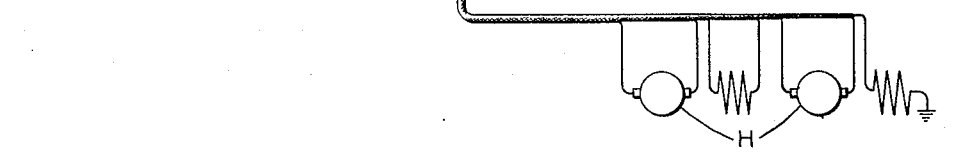
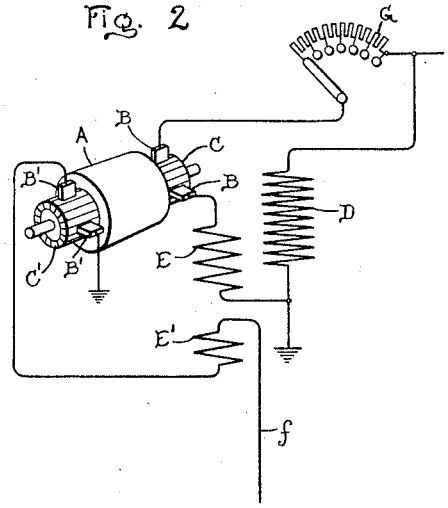
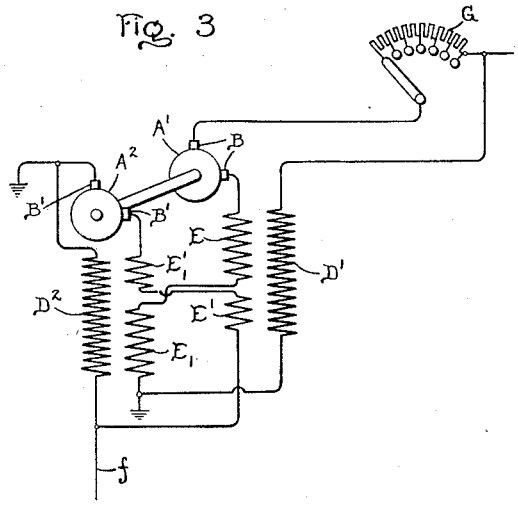
WITNESSES:
Lester H. Palmer
J. Ellis Glen
INVENTOR
MAX R. HANNA.
BY
ATTY.

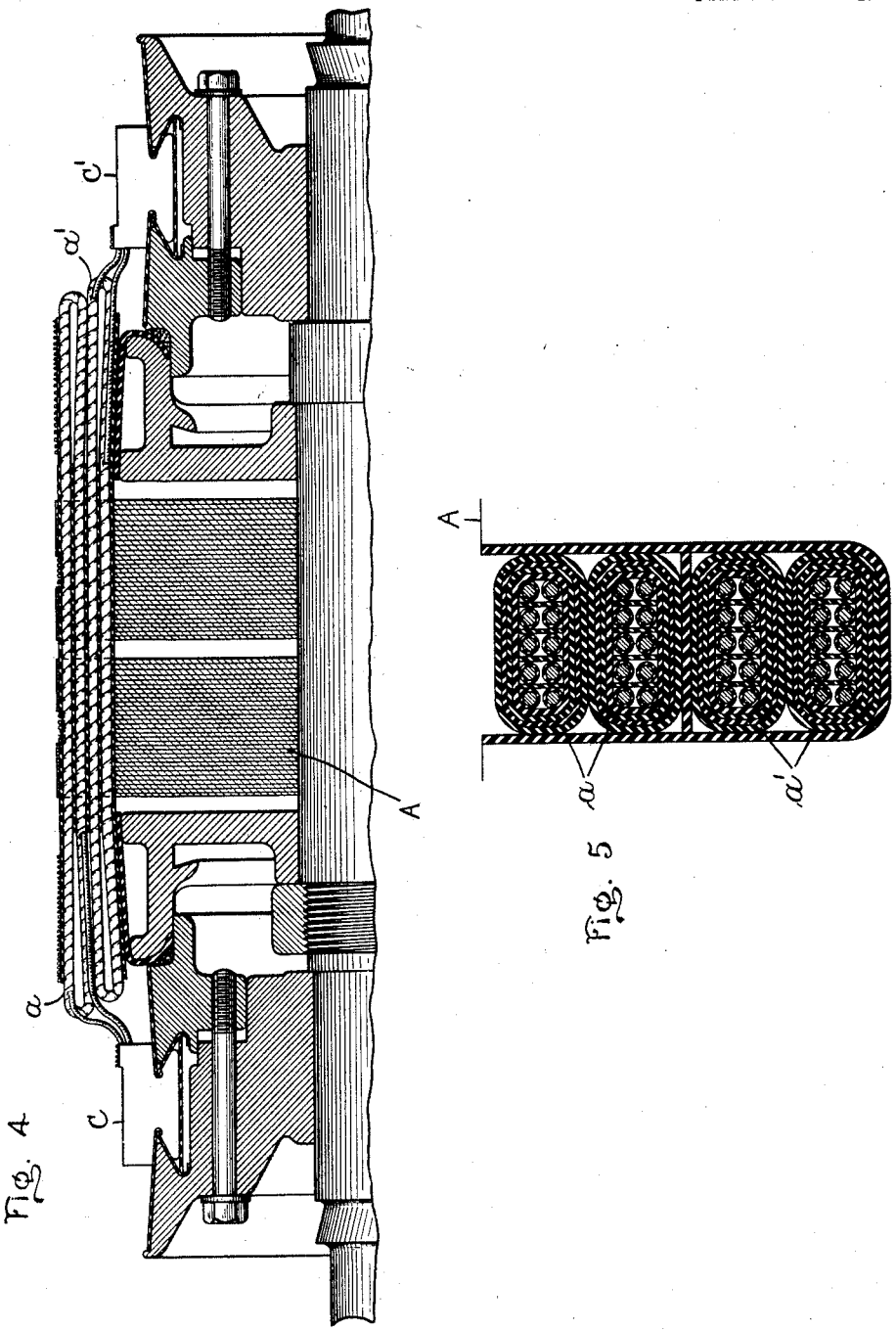

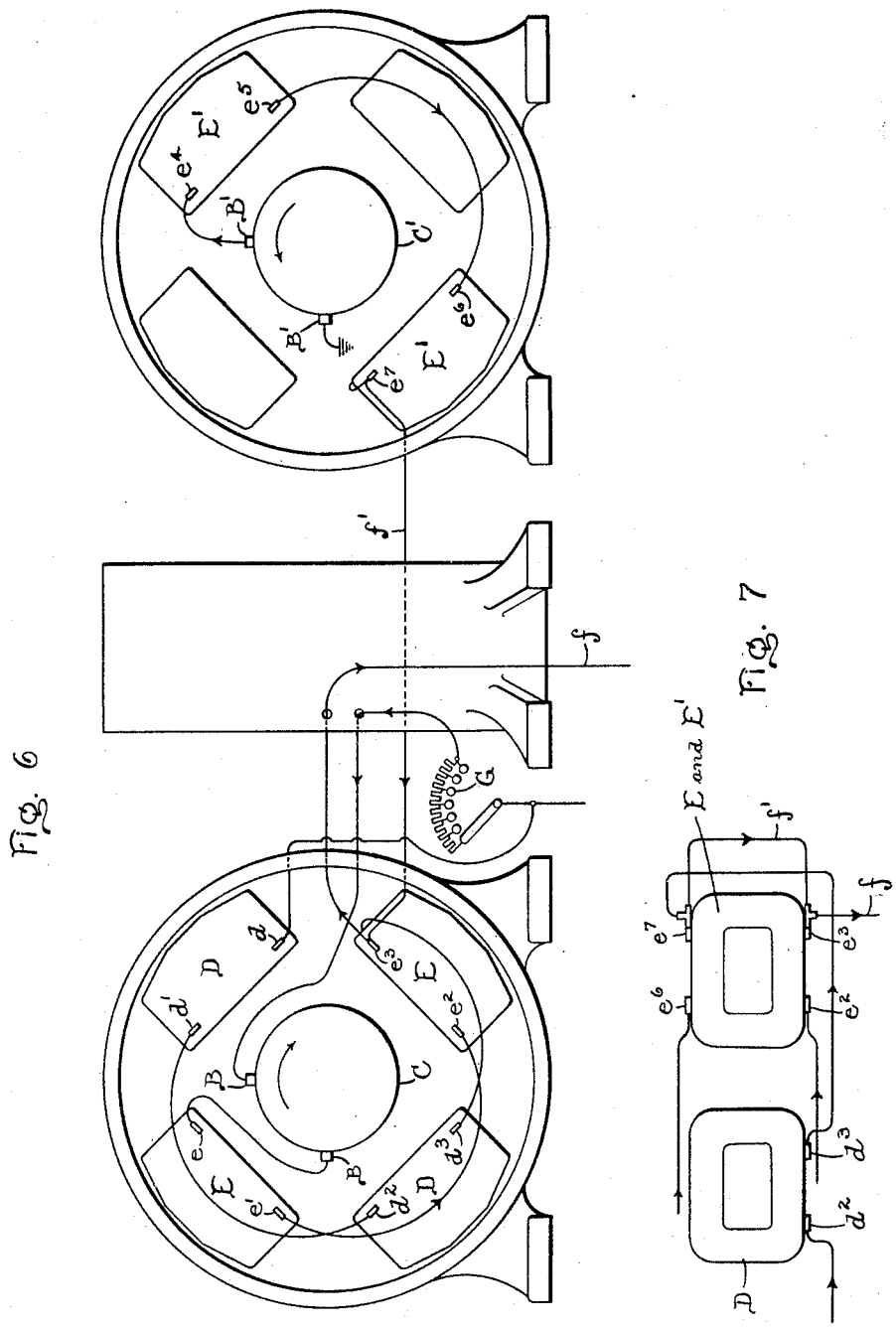

No. 897,257. PATENTED AUG. 25, 1908.
M. R. HANNA.
DYNAMO ELECTRIC MACHINE.
APPLICATION FILED FEB. 19, 1908.
4 SHEETS—SHEET 4.
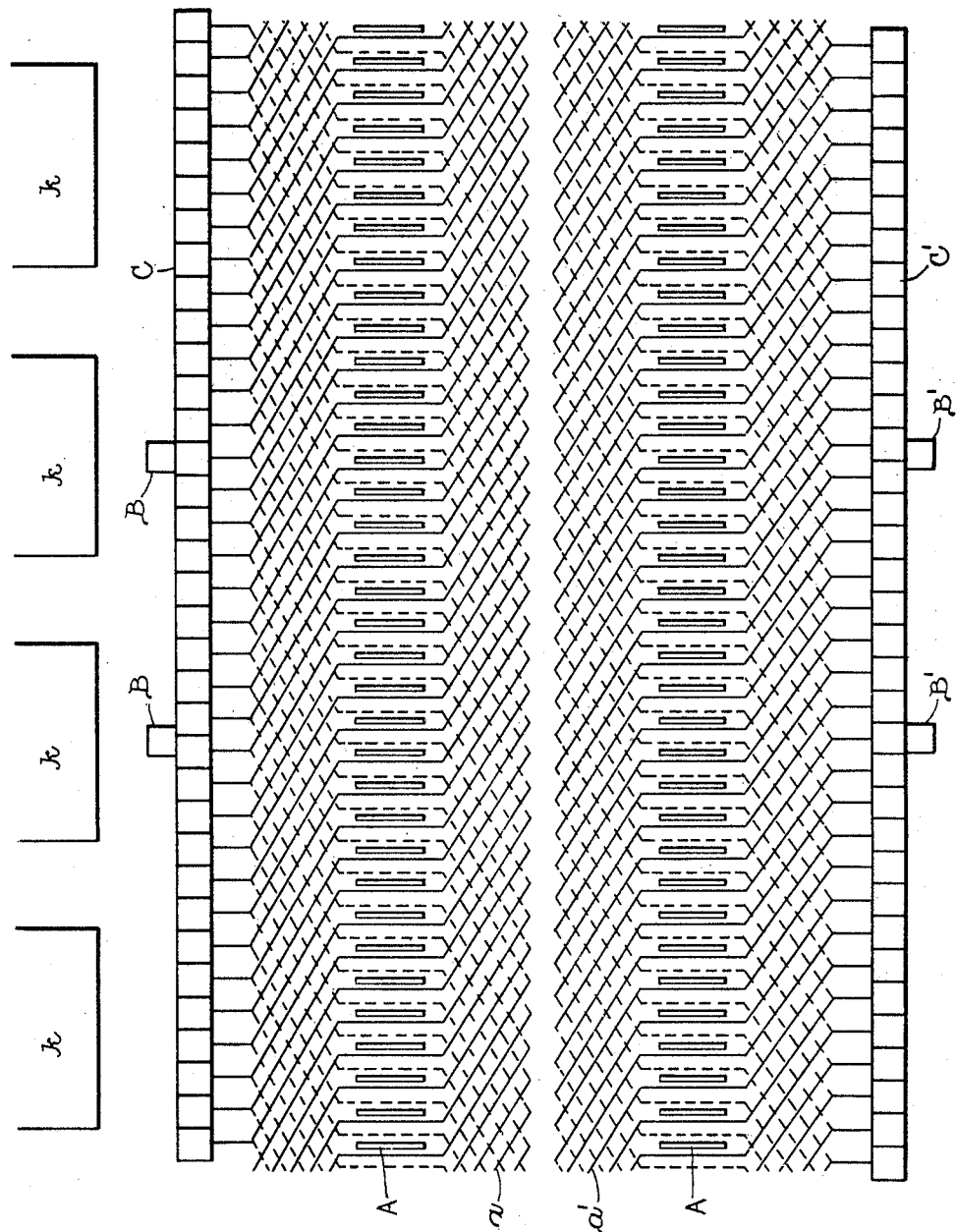
WITNESSES:
Lester H. Palmer,
J. Ellis Glen.
INVENTOR
MAX R. HANNA.
BY
ATT'Y.

UNITED STATES PATENT OFFICE.

MAX R. HANNA, OF SCHENECTADY, NEW YORK, ASSIGNOR TO GENERAL ELECTRIC COMPANY, A CORPORATION OF NEW YORK.

DYNAMO-ELECTRIC MACHINE.

No. 897,257. Specification of Letters Patent. Patented Aug. 25, 1908.

Application filed February 19, 1908. Serial No. 416,657.

*To all whom it may concern:*

Be it known that I, MAX R. HANNA, a citizen of the United States, residing at Schenectady, in the county of Schenectady, State of New York, have invented certain new and useful Improvements in Dynamo-Electric Machines, of which the following is a specification.

My invention relates to dynamo-electric machines for transforming direct-current from one voltage into another. These machines are technically known as dynamotors. They comprise two armature windings provided with commutators and adapted to be connected respectively in the supply and load circuits. The two armature windings may both be placed on the same armature core and have a single field magnet in common, in which case the machine is technically known as a dynamotor, or they may be placed on separate armature cores and have separate field magnets as a motor-generator. Placing both windings on the same armature core is advantageous, since it not only greatly reduces the cost of the dynamotor but also improves its commutation, since the currents in the two armature windings tend to neutralize each other magnetically, so that the machine is without armature reaction in normal operation.

My invention, in certain of its features, relates specifically to a dynamotor having both armature windings on the same core, while in other of its features, it is not so limited, but is equally applicable to a motor-generator set with separate armatures and field magnets.

Dynamotors and motor-generators are now finding a useful application in connection with 1200-volt direct-current car equipments. In view of the almost universal use in the past of 600 volts for electric roads, it is desirable that a car equipped for 1200 volts should be able to operate also on 600 volts. The cost of designing the contactors and other control devices for operation on both 600 or 1200 volts is, however, large, and it, therefore, is ordinarily simpler and cheaper to provide a dynamotor for use when the car is operating on 1200 volts to transform the high-voltage current down to 600 volts for operating the contactors or other control devices. A dynamotor, when thus used, is subjected to particularly severe operating conditions, which my invention is especially well adapted to meet. Consequently, although my invention is not limited to a dynamotor operated in connection with a car equipment, it is particularly advantageous for use with a dynamotor so operated.

The dynamotor should operate at substantially constant voltage and speed, and should, therefore, be a shunt-wound machine. If, however, a simple shunt-wound dynamotor is employed in connection with high-voltage car equipments, trouble arises in operation, when the trolley pole is removed from the trolley-wire, and also when it is replaced. When the trolley is removed, the dynamotor, running under its own momentum, acts as a generator to supply current to the circuit of the driving motors, which acts practically as a short-circuit on the machine. Then when the trolley is replaced a heavy rush of current follows on account of the decrease in speed and voltage in the dynamotor during the time that the trolley is off the wire. This rush of current could be avoided by making the dynamotor compound-wound, but this would be objectionable in normal operation, since it would produce variations of speed with variation of load.

My invention, in one aspect, consists in providing, in addition to the shunt winding which produces the magnetization of the machine in normal operation, field windings which are arranged to be inoperative in the normal operation of the machine as a dynamotor, but to become effective when the machine is operating as a generator or motor only, as is the case when the trolley comes off the wire and when it is again replaced. More specifically stated, I provide, in addition to the shunt winding, two series windings connected in series with the two armature windings, respectively, and arranged normally to oppose and neutralize each other, so that for normal operation the machine is a simple shunt machine; but when it acts as a motor or generator only, the current in one of the series windings is either cut off or reversed, so that a series characteristic is superposed on the shunt characteristic under all abnormal conditions, thereby preventing an excessive rush of current due to these conditions. This change from shunt to compound or differential characteristic is entirely automatic.

In order that the series windings may be effective upon a sudden change in the connections of a dynamotor it is essential that these windings build up their magnetization rapidly. If they are placed on the same field poles with the shunt winding, a rapid building up of the series magnetization is hindered by the shunt winding, which acts somewhat as a short-circuited secondary opposing a change of flux in the field poles.

Another feature of my invention consists, accordingly, in placing the series windings on different poles from those occupied by the shunt winding. This, of course, can be readily done in a multipolar machine. The shunt windings will still to some extent hinder the rapid building up of the flux in the poles upon which it is placed, but a considerable flux will be built up in the series wound poles which will return by leakage paths not through the shunt wound poles. This would of course be objectionable with a multiple wound armature, but with a series wound armature the unequal strength of the poles while building up is not objectionable, and the more rapid increase in flux obtained in this way is highly beneficial.

When the two armature windings are placed on the same armature core, it becomes necessary ordinarily to superpose them in the same slots. If both windings have the same coil-pitch, as is customary, then the coils of one winding, which at any instant are undergoing commutation, lie in the same slots as those of the other winding which are also undergoing commutation. In the normal operation of the machine as a dynamotor, this condition may be beneficial for commutation, but its beneficial effect is unimportant, since the commutation of the machine when working as a dynamotor is always good, owing to the absence of armature reactance. Under abnormal conditions, however, when the machine is operating as a motor or generator only, and particularly when both windings are taking part in the motor or generator-action, the simultaneous commutation of coils of both windings in the same slots is highly detrimental, and it is at precisely at this time that good commutation is most difficult to obtain, because armature reaction is no longer absent.

One feature of my invention, accordingly, consists in arranging the two windings with different coil-pitches, so that the coils of one winding at any instant undergoing commutation lie in different slots from the coils of the other winding undergoing commutation. Since the coils which lie in the bottom of the slots have a greater reactance than those which lie in the top of the slots, which reactance is prejudicial to commutation, and since a fractional-pitch is favorable to good commutation, I make the winding at the bottom of the slots fractional-pitch, while that at the tops of the slots may be full-pitch. Furthermore, I place in the tops of the slots the winding which is connected to the circuit of higher voltage, both because the increased voltage on this winding makes commutation somewhat more difficult, and also because a ground is more likely to occur on this winding, which can be more readily inspected, removed and replaced if it is in the top of the slots.

My invention will best be understood by reference to the accompanying drawings, in which Figure 1 shows diagrammatically a dynamotor having its field windings arranged in accordance with my invention; Fig. 2 shows a modification of the same, in which the two armature circuits are independent of each other instead of being combined, as in Fig. 1; Fig. 3 shows a further modification, in which independent armatures and field windings are employed; Fig. 4 shows a cross-sectional view of an armature arranged with two armature windings and commutators; Fig. 5 shows on an enlarged scale the arrangement of the two windings in the slots; Fig. 6 is a diagrammatic development of the field magnet showing both end views and a side view of the same; Fig. 7 is a plan view of the lower field coils showing their connections; and Fig. 8 is a development on a plane surface of the two armature windings, the windings being shown separated for the sake of clearness.

In Fig. 1, A is the armature of a dynamotor, which is provided with two armature windings, $a$ and $a'$, (shown in Fig. 4) provided with commutators C and C', on which bear the commutator brushes B and B', respectively. D represents a shunt winding which supplies the excitation of the machine in normal operation. E and E' are field windings connected in series with the two armature windings, respectively. These two series windings oppose and neutralize each other in normal operation. The brushes B B are connected to the high-voltage supply-circuit, one terminal of which is indicated by the trolley F. G represents a starting rheostat. In Fig. 1 the supply and load circuits are shown inter-connected, as in an autotransformer; the supply circuit extending from the trolley F through rheostat G, armature winding $a$, field windings E and E' in series, and armature winding $a'$ to ground. The load-circuit is connected between conductor $f$ and ground,—that is, across the terminals of armature winding $a'$ and series field winding E' in series. H represents the driving motors for the vehicle, which are connected to the trolley F through contactors (not shown) in the contactor-box I. These contactors are controlled by the master-controllers J, which are connected to the conductor $f$. It is windings of the contactors and of whatever other control devices there are on the vehicle, which form the load of the dynamotor.

When the dynamotor is at rest, and the master-controllers J are in off-position, the dynamotor may be started like a series, or rather like a compound-wound motor, for current then flows through the load-circuit, which has been traced above, and which includes both series windings E and E′. Under these conditions the currents in these two windings assist each other in magnetizing the field magnet, but when the dynamotor is up to speed and the load is thrown onto it, the current in the field winding E′ is reversed and neutralizes the magnetizing effect of the current in the winding E. The machine thus automatically becomes a shunt machine in effect. If, in the course of operation, the trolley F leaves the wire and the dynamotor, driven by its own momentum, acts as a generator supplying current through the circuit of the driving motors H, this current flows through the field windings E′ and E in series, its direction being reversed in the field winding E, and opposes the magnetization of the shunt winding D, since the current in the series winding E′ is normally in opposition to that in the shunt winding. A differential magnetization is thereby produced, which prevents an excessive rush of current from the dynamotor. Similarly, when the trolley is replaced and both armature windings act as motor windings, the current in winding E′, as at starting, is in the opposite direction from normal, so that the windings E and E′ assist the shunt winding and produce a compound characteristic in the dynamotor, strengthening the field and preventing excessive flow of current to the machine.

The inter-connection of supply and load-circuits of the dynamotor, while advantageous, since it results in producing a voltage of only 600 volts across the terminals of each armature winding, is, nevertheless, not essential to my invention. In Fig. 2 the load and supply-circuits are entirely independent, the only difference in the arrangement of the windings being that the winding E is given twice as many turns as the winding E′, since with the arrangement of Fig. 2 it carries only half the current of the other, if the voltage of the supply-circuit is twice that of the load-circuit.

In Fig. 3 separate armatures and separate fields are indicated, as in an ordinary motor-generator set. The two armatures are indicated by $A'$ and $A^2$ and the two shunt field windings by $D'$ and $D^2$. Each field has two series windings in series with the two armatures, respectively. The winding E in series with armature $A'$ normally assists the shunt winding $D'$ while the winding E′ in series with the armature $A^2$ normally opposes and neutralizes winding E. Similarly, windings $E'_1$ and $E_1$ normally neutralize each other. The effect of these windings under abnormal conditions is the same as that of the windings E and E′ in Fig. 1.

In order that the full benefit of the series windings may be obtained, it is essential that the magnetization due to the series windings be built up as rapidly as possible when abnormal conditions arise, and as has been already explained, if the shunt winding is placed on the same poles as the series windings, it acts to oppose a change of flux in the field poles, and, therefore, to retard the magnetizing effect of the series windings. For this reason I arrange the shunt and series windings on different poles, as is shown in Fig. 6. In this figure both end elevations are shown on opposite sides of the side elevation of the machine, so as to show all the field coil connections, and the direction of current-flow in the coil-connections is indicated by arrow-heads. These connections are the same as those shown in Fig. 1, and may be traced as follows: The current from the supply circuit divides; a part passing through rheostat G, brushes B B and series winding E through the coil terminals $e$, $e^1$, $e^2$ to $e^3$, and the other part passing through the shunt winding D, through coil terminals $d$, $d^1$, $d^2$, $d^3$, $e^7$ (see Fig. 7) and conductor $f^1$ to terminal $e^3$. To this terminal $e^3$ the conductor $f$, forming one lead of the load-circuit, is connected. The current from the other armature winding may be traced from ground through brushes B′ and series winding E′ through coil terminals $e^4$, $e^5$, $e^6$, $e^7$ and conductor $f^1$ to terminal $e^3$ and conductor $f$. The coils E′ and E, which are placed on the same poles, are indicated separately as to their coil terminals only.

If a single armature is employed for both armature windings, the two windings may be superposed in the same slots, as shown in Fig. 4. It has already been explained that if the coils of the two windings that are undergoing commutation at any instant lie in the same slots, the result will be bad with respect to commutation when the machine is running as either motor or generator alone. In order to avoid this result, I give the two windings different pitches, as is shown in Fig. 8. In this figure I have indicated a four-pole armature having thirty-five slots. The motor winding $a$ has a coil-pitch of nine slots,—or in other words, has approximately full-pitch. The generator winding $a'$, which is in the bottom of the slots, and for this reason has a higher reactance, is given a fractional-pitch of eight slots only. The result of this arrangement, as will be seen from Fig. 8, is that the coils of the two windings which at any instant are undergoing commutation lie in different slots, so that commutation under abnormal conditions, which are the only conditions under which faulty commutation usually occurs, is materially improved. The positions of the field poles are indicated in Fig. 8 by $k$.

The motor winding $a$ is placed in the top of the slots for the reason that it is connected to the high-voltage circuit, which makes the commutation conditions more severe, and which renders it more liable to grounds.

I do not desire to limit myself to the particular construction and arrangement of parts here shown, but aim in the appended claims to cover all modifications which are within the scope of my invention.

What I claim as new and desire to secure by Letters Patent of the United States, is

1. A dynamo-electric machine for transforming direct-current from one voltage to another, having two armature windings provided with commutators and adapted to be connected respectively in the supply and load-circuits, a shunt field winding, and two series field windings in series with the two armature windings respectively and arranged to oppose each other in the normal operation of the machine.

2. A dynamo-electric machine for transforming direct-current from one voltage to another, having two armature windings provided with commutators and adapted to be connected respectively in the supply and load-circuits, a field winding for producing the normal excitation of the machine, and field windings arranged to be inoperative in the normal operation of the machine as a transformer, but to become effective when the machine is operated as a motor or generator only.

3. A dynamo-electric machine transforming direct-current from one voltage to another, having two armature windings provided with commutators and adapted to be connected respectively in the supply and load-circuits, a shunt field winding, a field winding in series with the motor armature winding normally assisting the shunt winding, and a field winding in series with the generator armature winding normally opposing and neutralizing the other series winding.

4. A dynamotor for transforming direct-current from one voltage to another, having a single armature core and two armature windings thereon provided with independent commutators and adapted to be connected respectively in the supply and load-circuits, a shunt field winding, and two series field windings in series with the two armature windings respectively and arranged to oppose each other in the normal operation of the dynamotor.

5. A dynamotor for transforming direct-current from one voltage to another, having a single armature core and two armature windings thereon provided with independent commutators and adapted to be connected respectively in the supply and load-circuits, a field winding for producing the normal excitation of the machine, and field windings arranged to be inoperative in the normal operation of the machine as a dynamotor but to become effective when the machine is operated as a motor or generator only.

6. A dynamo-electric machine for transforming direct-current from one voltage to another, having two armature windings provided with commutators and adapted to be connected respectively in the supply and load-circuits, a multipolar field magnet, a shunt field winding on a portion only of the poles thereof, and two series field windings on the other poles thereof connected series with the two armature windings respectively and arranged to oppose each other in the normal operation of the machine.

7. A dynamotor for transforming direct-current from one voltage to another, having a single armature core and two armature windings thereon provided with independent commutators and adapted to be connected respectively in the supply and load-circuits, a multipolar field magnet, a shunt field winding on a portion of the poles thereof, and two series windings on the other poles thereof connected in series with the two armatures respectively and arranged to oppose each other in the normal operation of the dynamotor.

8. A dynamotor for transforming direct-current from one voltage to another, having a single armature core and two armature windings thereon of different coil pitches provided with independent commutators and adapted to be connected respectively in the supply and load-circuits.

9. A dynamotor for transforming direct-current from one voltage to another, having a single armature core and two armature windings thereon provided with independent commutators and adapted to be connected respectively in the supply and load-circuits, said two windings being superposed in slots on said core and having different coil-pitches.

10. A dynamotor for transforming direct-current from one voltage to another, having a single armature core and two armature windings thereon provided with independent commutators and adapted to be connected respectively in the supply and load-circuits, said two windings being superposed in slots on said core and the winding in the bottom of the slots having a smaller coil-pitch than the other.

11. A dynamotor for transforming direct-current from one voltage to another, having a single armature core and two armature windings thereon provided with independent commutators and adapted to be connected respectively in the supply and load-circuits, said two windings being superposed in slots on said core and the winding in the top of the slots being of full-pitch and the other of fractional-pitch.

12. A dynamotor for transforming direct-current from one voltage to another, having a single armature core and two armature windings thereon provided with independent commutators and adapted to be connected respectively in the supply and load-circuits, said two windings being superposed in slots on said core and having different coil-pitches, and the winding connected to the circuit of higher voltage being in the top of the slots.

In witness whereof, I have hereunto set my hand this 14th day of February, 1908.

MAX R. HANNA.

Witnesses:
BENJAMIN B. HULL,
HELEN ORFORD.